United States Patent Office 3,169,979
Patented Feb. 16, 1965

3,169,979
3-HYDRAZINO ANDROSTANE DERIVATIVES
George de Stevens, Willow Knoll, New Providence, N.J., assignor to Ciba Corporation, a corporation of Delaware
No Drawing. Filed Mar. 30, 1961, Ser. No. 99,337
14 Claims. (Cl. 260—397.5)

The present invention relates to 3-hydrazino-androstane compounds, especially those of the formula:

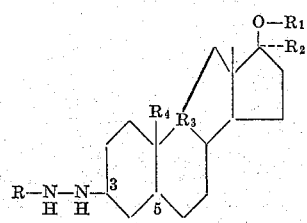

in which R represents hydrogen or the acyl radical of an organic acid, $R_1$ represents hydrogen or the acyl radical of an organic acid, $R_2$ represents hydrogen or an aliphatic hydrocarbon radical, the group $R_3$ represents one of the groups of the formula:

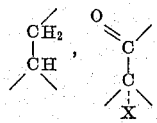

or

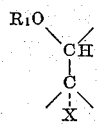

in which $R_1$ has the previously given meaning, and X stands for hydrogen or halogeno, $R_4$ represents methyl or hydrogen, and in which the hyrazino group attached to the 3-position has preferably the β-configuration and the hydrogen attached to the 5-position the α-configuration, or salts thereof, as well as procedure for the preparation of such compounds.

The acyl radical of an organic acid represented, for example, by the group R, which may also stand for hydrogen, is the acyl radical of an organic carboxylic acid, as well as of an organic sulfonic acid, which contains preferably from one to twelve carbon atoms. Such acids are, for example, alkanoic acids, e.g. acetic, propionic, n-butyric, n-valeric, trimethylacetic, caproic, heptaneoic, caprylic, pelargonic, capric, undecylic, lauric acid and the like, alkenoic acids, e.g. 3-butenoic, undecylenic acid and the like, cycloalkyl-alkanoic acids, e.g. cyclopentylpropionic, cyclohexylacetic, cyclopropylpropionic acid and the like, alkane dicarboxylic acids, e.g. oxalic, malonic, succinic, glutaric acid and the like, alkene dicarboxylic acids, e.g. maleic, fumaric acid and the like, carbocyclic aryl carboxylic acids, such as monocyclic or bicyclic carbocyclic aryl carboxylic acids, e.g. benzoic, naphthoic acid and the like, carbocyclic aryl-aliphatic carboxylic acids, such as monocyclic carbocyclic aryl-lower alkanoic acids, e.g. phenylacetic, 3-phenylpropionic acid and the like, or carbocyclic aryl-alkenoic acids, e.g. cinnamic acid and the like, heterocyclic aryl carboxylic acids, such as monocyclic heterocyclic aryl carboxylic acids, for example, pyridine carboxylic acids, e.g. nicotinic, isonicotinic acid and the like, furan carboxylic acids, e.g. 2-furoic acid and the like, thiophene carboxylic acids, e.g. 2-thiophenyl carboxylic acid and the like, or heterocyclic aryl-aliphatic carboxylic acids, such as monocyclic heterocyclic aryl-lower alkanoic acids, for example, pyridyl-lower alkane carboxylic acids, e.g. 2-pyridyl-acetic, 3-pyridyl-acetic, β-(4-pyridyl)-propionic acid and the like, or any other suitable organic carboxylic acid, as well as organic sulfonic acid, such as methane sulfonic, ethane sulfonic, p-toluene sulfonic acid and the like.

The group $R_1$, which also represents hydrogen, may stand for one of the acyl radicals of the above-mentioned organic carboxylic or sulfonic acids.

Apart from representing hydrogen, $R_2$ stands for an aliphatic hydrocarbon radical, containing preferably from one to four carbon atoms, such as lower alkyl, e.g. methyl, ethyl, n-propyl, isopropyl, n-butyl, isobutyl and the like, as well as lower alkenyl, e.g. vinyl, allyl, 2-methyl-allyl, 3-methyl-allyl and the like, or lower alkynyl, e.g. ethynyl, 1-propynyl and the like.

The group $R_3$ represents the group of the formula:

as well as one of the groups indicated hereinabove. X in the groups of the formulae:

and

whenever representing halogeno, stands for halogeno with a molecular weight below 80, particularly for fluoro, as well as chloro or bromo. $R_1$ in the formula:

stands primarily for hydrogen, but may also represent the acyl radical of an organic acid, particularly of one of the above-described organic carboxylic acids.

$R_4$ may represent hydrogen, but stands especially for methyl.

Preferably, the compounds of the present invention are of the androstane series, i.e. compounds, in which the hydrogen atom atached to the 5-position has the α-configuration. The hydrazino group atached to the 3-position has preferably the β-configuration.

Salts of the above compounds are acid addition salts, particularly pharmaceutically acceptable acid addition salts, such as those with inorganic acids, e.g. hydrochloric, hydrobromic, sulfuric, nitric, phosphoric acids and the like, as well as those with organic acids, e.g. tartaric, citric, maleic, methane sulfonic and the like.

The compounds of the present invention have androgenic and anabolic effects and can, therefore, be used in lieu of known androgens, such as testosterone, methyl testosterone and the like, for the treatment of menopausal disturbances, as well as in building up tissue and the like. Furthermore, compounds of this invention show gonadotropin-inhibiting effects and thus exert an effect on the regulation of the ovulation and the endometrical and placental development.

Particularly useful are the compounds of the formulae:

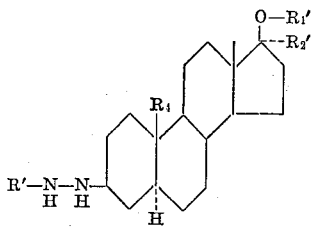

and

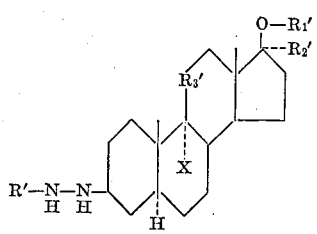

in which R' represents hydrogen, lower alkanoyl or pyridoyl, $R_1'$ stands for hydrogen or lower alkanoyl, $R_2'$ stands for hydrogen or lower alkyl, $R_3'$ represents hydroxymethylene or carbonyl, $R_4$ stands for methyl or hydrogen, and X for hydrogen or halogeno having an atomic weight below 80, or pharmacologically acceptable acid addition salts thereof.

The new compounds of this invention may be used as medicaments in the form of pharmaceutical preparations, which contain the new androstane compounds or the salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols, or any other known inert carrier substance. The preparations may be used in solid form, for example, as capsules, tablets, dragees and the like, or in liquid form, for example, as solutions, suspensions, and the like. If desired, they may contain auxiliary substances, such as preserving stabilizing, wetting, emulsifying agents and the like, salts for varying the osmotic pressure, buffers, etc. They may also contain, in combination, other pharmacologically useful substances.

The compounds of the present invention may be prepared according to per se conventional methods, for example, by converting in a 3-hydrazono-androstane compound, or in a ring A dehydro derivative thereof, particularly in a compound of the formula:

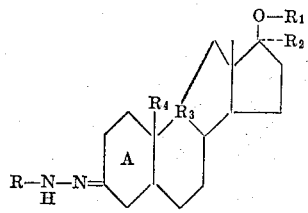

in which R, $R_1$, $R_2$, $R_3$ and $R_4$ have the previously given meaning, or in a ring A dehydro derivative thereof, or a salt of such compound, the hydrazono group, particularly the group of the formula R—NH—N=, in which R has the previously given meaning, into a hydrazino group, particularly into a group of the formula R—NH—NH—, in which R has the previously given meaning, by reduction, and, if desired, converting in a resulting compound the hydrazino group into another hydrazino group, and/or, if desired, converting a resulting salt into the free base, and/or, if desired, converting a resulting compound into a salt thereof.

A ring A dehydro derivative used as the starting material is a compound which contains in ring A one or two double bonds. Such double bond is preferably located in the 4,5-position, but may also be in the 1,2-position, or, whenever a 19-nor derivative is used as the starting material, i.e. $R_4$ represents hydrogen, in the 5,10-position; whenever two double bonds are present in ring A such double bonds are located in the 1,2-position and the 4,5-position. A salt of the starting material is particularly an acid addition salt, such as an addition salt with an inorganic or organic acid, which may also be formed in situ, whenever the conversion of a hydrazono into a hydrazino group is carried out in an acidic medium.

The reduction of a hydrazono-androstane compound into the desired hydrazino-androstane compound is carried out according to known methods, for example, by treatment with catalytically activated hydrogen. Catalysts used in such hydrogenation procedure contain a metal selected from the eighth group of the Periodic System, such as nickel, palladium, platinum and the like; suitable catalysts are, for example, Raney nickel, platinum oxide and the like. The hydrogenation reaction is carried out in the presence of a suitable solvent, e.g. acetic acid and the like, at atmospheric pressure, or, if necessary, under increased pressure and/or at an elevated temperature. The conversion of the hydrazono compound into the hydrazino compound may also be carried out by treatment with suitably generated nascent hydrogen, as well as by treatment with a light metal hydride capable of converting a hydrazono group into a hydrazino group.

In the above hydrogenation procedure, the double bond in a ring A dehydro starting material may be removed simultaneously, particularly whenever catalytically activated hydrogen is being used as the reagent.

Also included within the scope of this invention are the 3-hydrazono-androstane compounds used as the starting materials in the above-described procedure especially the compounds of the formula:

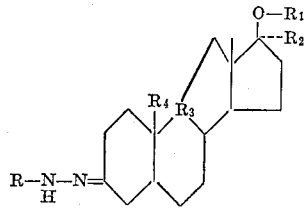

in which $R_1$, $R_2$, $R_3$ and $R_4$ have the previously given meaning, or an A-ring dehydro derivative thereof, or salts of such compounds. Apart from being intermediates, these 3-hydrazono-androstane compounds also have androgenic, anabolic or gonadotropin-inhibiting effects, such as those described hereinabove and can be used accordingly.

Particularly useful as intermediates, which also have pharmacological activities of their own, are the compounds having the formulae:

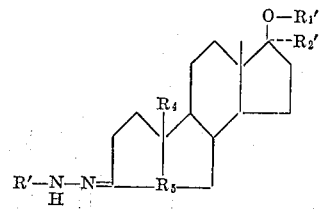

and

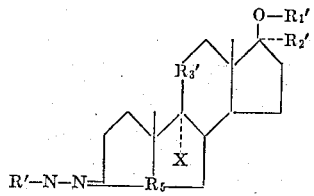

in which R', R$_1$', R$_2$', R$_3$', R$_4$ and X have the previously given meaning, and R$_5$ represents one of the groups of the formulae:

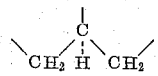

or

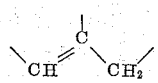

and pharmacologically acceptable acid addition salts thereof.

These compounds may be prepared according to per se conventional methods, for example, by reacting an androstan-3-one compound or a ring A dehydro derivative thereof, particularly a compound of the formula:

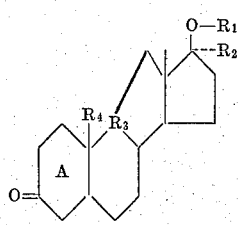

in which R$_1$, R$_2$, R$_3$ and R$_4$ have the previously given meaning, or a ring A dehydro derivative thereof, with a hydrazine compound, particularly with a compound of the formula R—NH—NH$_2$, in which R has the previously given meaning, and, if desired, converting in a resulting compound the hydrazono group into another hydrazono group, and/or, if desired, converting a resulting salt into the free base, and/or, if desired, converting a resulting compound into a salt thereof.

A ring A dehydro derivative used as the starting material is a compound containing in ring A one or two double bonds. Such bond is preferably located in the 4,5-position, but may also be in the 1,2-position, or whenever the starting material is a 19-nor-compound, i.e. R$_4$ represents hydrogen, in the 5,10-position; two double bonds present in ring A are preferably located in the 1,2-position and in the 4,5-position.

The preparation of the hydrazono androstane compounds is carried out according to methods known per se, for example, by treating the androstan-3-one starting material with the hydrazine compound in a suitable solvent, e.g. ethanol and the like, if necessary, at an elevated temperature and/or in the atmosphere of an inert gas, e.g. nitrogen.

In a resulting hydrazino-androstane compound or the corresponding hydrazono-androstane starting material, in which the hydrazino or hydrazono groups carry an acyl group, i.e. R in the above formulae represents acyl, such acyl groups may be removed by per se conventional hydrolysis procedures, for example, by treatment with an aqueous mineral acid, e.g. hydrochloric acid and the like.

Depending on the conditions used, the compounds of this invention are obtained in the form of the free bases or the salts thereof. A salt may be converted into the free base, for example, by reacting it with a basic reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, an anion exchange resin and the like. A free base may be converted into its pharmacologically acceptable acid addition salts by reaction with one of the inorganic or organic acids outlined hereinbefore, for example, by treating a solution of the base in an inert solvent with the acid or a solution thereof. The salts may also be obtained as the hemihydrates, monohydrates, sesquihydrates or polyhydrates depending on the conditions used for the formation of the salts.

The invention also comprises any modification of the process wherein a compound obtainable as an intermediate at any stage of the process is used as starting material, and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a solution of 10.0 g. of 3-acetylhydrazono-17β-propionyloxy-5α-androstane in 100 ml. of acetic acid is added 0.225 mg. of platinum oxide, and the mixture is treated with hydrogen under a pressure of about 2.8 atmospheres and while shaking. The reaction mixture is filtered, the filtrate is evaporated to dryness, and the resulting 3β-(2-acetylhydrazino)-17β-propionyloxy-5α-androstane of the formula:

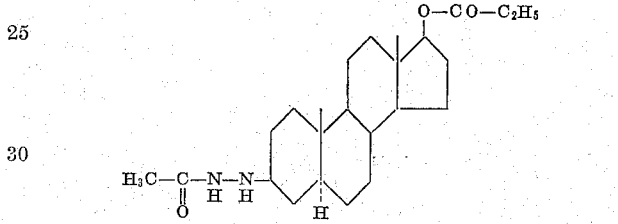

is obtained by recrystallizing the residue from ethanol, M.P. 215–217°; yield: 4.3 g.

The starting material may be prepared as follows: A solution of 10.0 g. of dihydrotestosterone propionate and 2.06 g. of acetyl-hydrazine is allowed to stand for several hours. The resulting precipitate is collected, and the desired 3-acetylhydrazono-17β-propionoyloxy-5α-androstane of the formula:

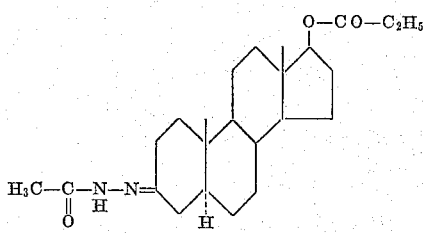

is obtained by recrystallization from hot ethanol, M.P. >280°.

*Example 2*

To a solution of 13.5 g. of 3-acetylhydrazono-5α-androstane-17β-ol in acetic acid is added 0.35 g. of platinum oxide, and the mixture is treated with hydrogen under a pressure of about 2.8 atmospheres while shaking. The reaction mixture is filtered, the acetic acid is removed, and the residue is recrystallized to yield the 3β-(2-acetylhydrazino)-5α-androstane-17β-ol of the formula:

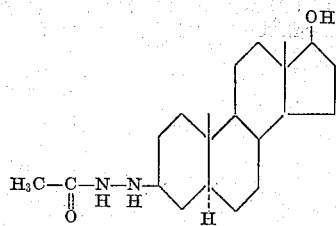

which melts at 230°.

A mixture of 5.0 g. of 3β-(2-acetylhydrazino)-17β-hydroxy-5α-androstane in 150 ml. of aqueous hydrochloric acid of 5 percent strength is refluxed for five hours while stirring under a nitrogen atmosphere. The reaction mixture is cooled, and the resulting crystalline material is collected and recrystallized from a mixture of ethanol and diethylether to yiel dthe 3β-hydrazino-5α-androstan-17β-ol of hydrochloride of the formula:

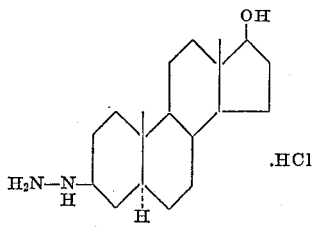

which melts at 250°.

The starting material may be prepared as follows: A mixture of 12.8 g. of dihydrotestosterone and 3.25 g. of acetylhydrazine in ethanol is allowed to stand over the weekend. The crystalline material is filtered off and recrystallized from ethanol to yield 3-acetylhydrazono-5α-androstan-17β-ol of the formula:

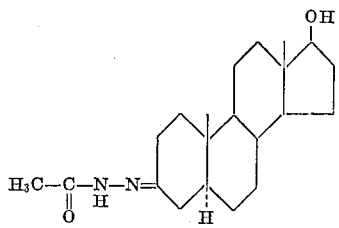

which melts at 245°.

*Example 3*

A mixture of 1.5 g. of 19-nor-testosterone and 2 ml. of hydrazine hydrate in 20 ml. of ethanol is refluxed for two hours. The solvent is removed and methanol is added to yield 3-hydrazono-19-nor-Δ⁴-androsten-17β-ol of the formula:

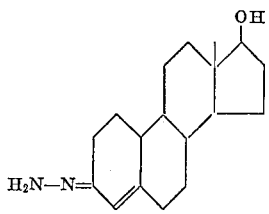

which is purified by recrystallization from methanol, M.P. 224–226°.

Upon treatment with hydrogen in the presence of platinum oxide according to the procedure of Example 1, the 3-hydrazono-19-nor-5α-androstan-17β-ol is obtained.

*Example 4*

A mixture of 5.0 g. of testosterone propionate and 1.03 g. of acetylhydrazine in ethanol is refluxed for 7 hours. The reaction mixture is chilled, the resulting crystalline material is collected and recrystallized from ethanol to yield the desired 3-acetylhydrazono-17β-propionyloxy-Δ⁴-androstene of the formula:

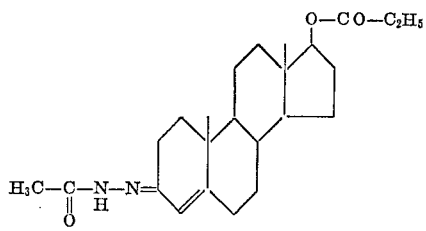

which melts at 230–231°.

Upon treatment with hydrogen in the presence of platinum oxide according to the procedure of Example 1, the 3-acetylhydrazono-17β-propionyloxy-Δ⁴-androstene is converted into the 3β-(2-acetylhydrazino)-17β-propionyloxy-5α-androstane, which is identical with the compound described in Example 1.

*Example 5*

A mixture of 5.0 g. of 17α-methyl-testosterone and 1.22 g. of acetylhydrazine in ethanol is refluxed for seven hours. The solvent is then removed, and the residue is recrystallized from ethanol to yield the 3-acetylhydrazono-17α-methyl-Δ⁴-androsten-17β-ol of the formula:

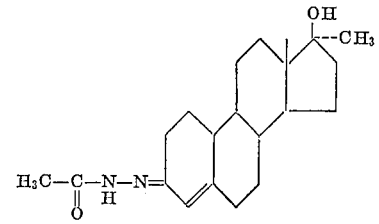

which melts at 233–235°.

A solution of 3-acetylhydrazono-17α-methyl-Δ⁴-androsten-17β-ol in acetic acid, when treated with hydrogen in the presence of platinum oxide according to the procedure of Example 1, yields the desired 3β-(2-acetylhydrazino)-17α-methyl-5α-androstan-17β-ol.

*Example 6*

A mixture of 1.0 g. of 19-nor-testosterone and 2.7 g. of acetylhydrazine in ethanol is refluxed for seven hours; the solvent is removed, and the residue is recrystallized from ethanol to yield 3-acetylhydrazono-19-nor-Δ⁴-androsten-17β-ol of the formula:

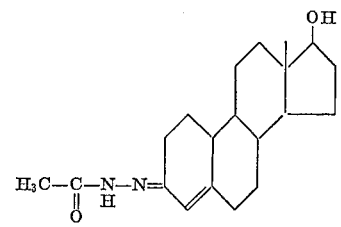

which melts at 285–287°. When treated with hydrogen in the presence of platinum oxide and acetic acid, this compound yields the desired 3β-(2-acetylhydrazino)-19-nor-5α-androsten-17β-ol.

*Example 7*

A mixture of 5.0 g. of 9α-fluoro-17α-methyl-Δ⁴-androsten-11β,17β-diol-3-one and 1.17 g. of acetylhydrazine in ethanol is refluxed for seven hours. The solvent is removed, and the crystalline residue is recrystallized from ethanol to yield the 3-acetylhydrazono-9α-fluoro-17α-methyl-Δ⁴-androsten-11β,17β-diol of the formula:

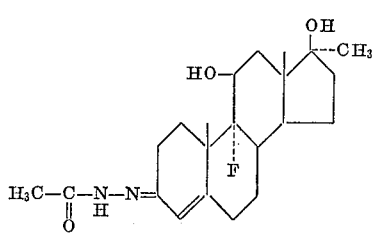

which melts at 272–275°.

A solution of 3-acetylhydrazono-9α-fluoro-17α-methyl-Δ⁴-androsten-11β,17β-diol in acetic acid, when treated with hydrogen in the presence of platinum oxide according to the procedure of Example 1, yields the 3β-(2-acetylhydrazino)-9α-fluoro-17α-methyl-5α-androstan-11β,17β-diol.

Example 8

A mixture of 8.2 g. of 3-isonicotinoylhydrazono-17β-propionyloxy-5α-androstane and 0.28 g. of platinum oxide in acetic acid is treated with hydrogen as described in Example 1. The catalyst is filtered off, the filtrate is concentrated and the residue is taken up in chloroform. The organic solution is washed with an aqueous sodium hydroxide solution, dried and evaporated to yield the 3β-(2 - isonicotinoylhydrazino)-17β-propionyloxy15α-androstane of the formula:

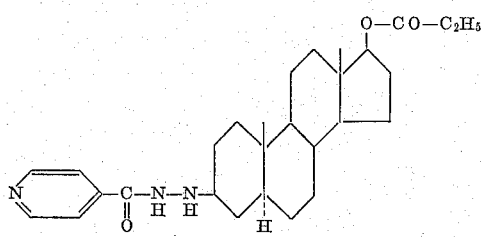

which melts at 215° after recrystallization from acetone.

The starting material may be prepared as follows: A mixture of 10.0 g. of dihydrotestosterone propionate and 3.95 g. of isonicotinic acid hydrazide in ethanol is refluxed for one hour. The solid material is filtered off and recrystallized from ethanol to yield the 3-isonicotinoylhydrazono-17β-propionyloxy-5α-androstane of the formula:

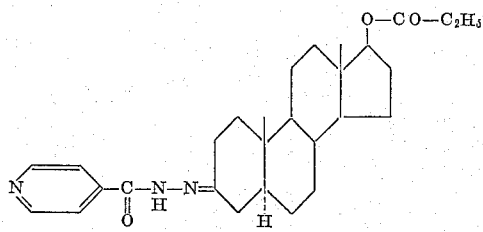

which melts at 242–245°.

What is claimed is:

1. 3β - (2 - acetylhydrazino) - 17β - propionyloxy-5α-androstane.
2. 3β-(2-acetylhydrazino)-5α-androstan-17β-ol.
3. 3β-hydrazino-5α-androstan-17β-ol.
4. 3 - acetylhydrazono - 17β - propionyloxy - 5α - androstane.
5. 3-acetylhydrazono-5α-androstan-17β-ol.
6. 3 - acetylhydrazono - 17β - propionyloxy - $\Delta^4$ - androstene.
7. 3 - acetylhydrazono - 17α - methyl - $\Delta^4$ - androsten-17β-ol.
8. 3-hydrazono-19-nor-$\Delta^4$-androsten-17β-ol.
9. 3-acetylhydrazono-19-nor-$\Delta^4$-androsten-17β-ol.
10. 3 - acetylhydrazono - 9α - fluoro - 17α - methyl-$\Delta^4$-androsten-11β,17β-diol.
11. A member selected from the group consisting of a 3-hydrazino-androstane compound of the formula

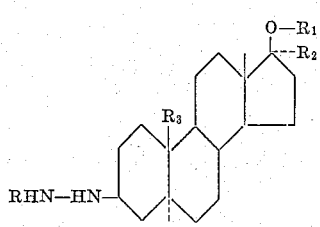

5:10-dehydro derivatives thereof when $R_3$ is hydrogen, 4:5-dehydro derivatives thereof when $R_3$ is methyl and pharmacologically acceptable acid addition salts of these compounds, wherein R is a member selected from the group consisting of hydrogen and lower alkanoyl, $R_1$ is a member selected from the group consisting of hydrogen, and acyl, said acyl being derived from an acid having 1 to 12 carbon atoms and selected from the group consisting of an organic carboxylic acid and an organic sulfonic acid, $R_2$ is a member selected from the group consisting of hydrogen, lower alkyl, lower alkenyl and lower alkynyl and $R_3$ is a member selected from the group consisting of hydrogen and methyl.

12. A member selected from the group consisting of a 3-hydrazino-androstane compound of the formula

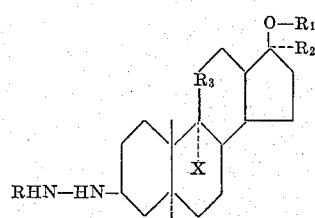

1:2-dehydro derivatives thereof, 4:5-dehydro derivatives thereof and pharmacologically acceptable acid addition salts of these compounds, wherein R is a member selected from the group consisting of hydrogen and lower alkanoyl, $R_1$ is a member selected from the group consisting of hydrogen and acyl, said acyl being derived from an acid having 1 to 12 carbon atoms and selected from the group consisting of an organic carboxylic acid and an organic sulfonic acid, $R_2$ is a member selected from the group consisting of hydrogen, lower alkyl, lower alkenyl and lower alkynyl, $R_3$ is a member selected from the group consisting of hydroxymethylene and carbonyl, and X is fluoro.

13. A member selected from the group consisting of a 3-hydrazono-androstane compound of the formula

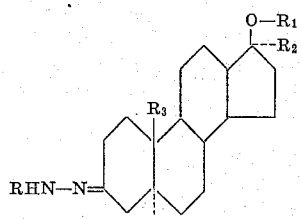

5:10-dehydro derivatives thereof, when $R_3$ is hydrogen, 4:5-dehydro derivatives thereof when $R_3$ is methyl and pharmacologically acceptable acid addition salts of these compounds, wherein R is a member selected from the group consisting of hydrogen and lower alkanoyl, $R_1$ is a member selected from the group consisting of hydrogen, and acyl, said acyl being derived from an acid having 1 to 12 carbon atoms and selected from the group consisting of an organic carboxylic acid and an organic sulfonic acid, $R_2$ is a member selected from the group consisting of hydrogen, lower alkyl, lower alkenyl and lower alkynyl and $R_3$ is a member selected from the group consisting of hydrogen and methyl.

14. A member selected from the group consisting of a 3-hydrazono-androstane compound of the formula

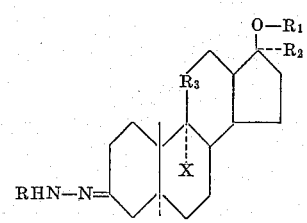

1:2-dehydro derivatives thereof, 4:5-dehydro derivatives thereof and pharmacologically acceptable acid addition salts of these compounds, wherein R is a member selected from the group consisting of hydrogen and lower alkanoyl, $R_1$ is a member selected from the group consisting of hydrogen and acyl, said acyl being derived from an acid having 1 to 12 carbon atoms and selected from the group consisting of an organic carboxylic acid and an organic sulfonic acid, $R_2$ is a member selected from the group consisting of hydrogen, lower alkyl, lower alkenyl and lower alkynyl, $R_3$ is a member selected from the group consisting of hydroxymethylene and carbonyl, and X is fluoro.

No references cited.